United States Patent [19]

Rahm

[11] Patent Number: 5,083,990

[45] Date of Patent: Jan. 28, 1992

[54] TWO-SPEED POWER TRANSMISSION FOR A POWER TOOL

[75] Inventor: Erik R. Rahm, Upplands Väsby, Sweden

[73] Assignee: Atlas Copco Tools AB, Stockholm, Sweden

[21] Appl. No.: 657,666

[22] Filed: Feb. 19, 1991

[30] Foreign Application Priority Data

Feb. 23, 1990 [SE] Sweden .................. 9000639

[51] Int. Cl.$^5$ ................................ F16D 3/22
[52] U.S. Cl. .................. 475/263; 475/266; 475/293
[58] Field of Search ............ 475/263, 266, 269, 293; 192/3.52, 56 R, 150

[56] References Cited

U.S. PATENT DOCUMENTS 3,034,623   5/1962   Amtsberg ............... 192/56 R

FOREIGN PATENT DOCUMENTS 0136991   2/1988   European Pat. Off.
53-67183  6/1978   Japan ................... 475/263

Primary Examiner—Leslie A. Braun
Assistant Examiner—William O. Trousdell
Attorney, Agent, or Firm—Frishauf, Holtz, Goodman & Woodward

[57] ABSTRACT

A two-speed power transmission for a power tool comprises a housing (10), an input shaft (20), an output shaft (15), a planetary gear (18) and a torque responsive gear shift mechanism (19) for directing torque through the planetary gear (18) in a high torque/low speed drive mode or past the planetary gear (18) in a low torque/high speed drive mode. The gear shift mechanism (19) comprises a driving member (26) connected to the sun wheel (21) of the planetary gear (18), a driven member (27) connected to the output shaft (15), and a number of axially movable coupling elements (30) arranged to intercouple in a first position the driving member (26) and the driven member (27) and intercouple in a second position the planet wheel carrier (24) of the planetary gear (18) and the driven member (27). The coupling elements (30) are continuously supported in the radial direction by an axially extending coupling sleeve (28) formed in one piece with the planet wheel carrier (24). A first cam (35) on the driving member (26) exerts an axial force on the coupling elements (30) against the action of a biassing spring (31) to move the coupling elements (30) from the first to the second positions, and a second cam (36b) on the driven member (27) for exerting an axial shifting force upon the coupling elements (30) toward the second positions of the coupling element (30) as they have left their first positions.

5 Claims, 1 Drawing Sheet

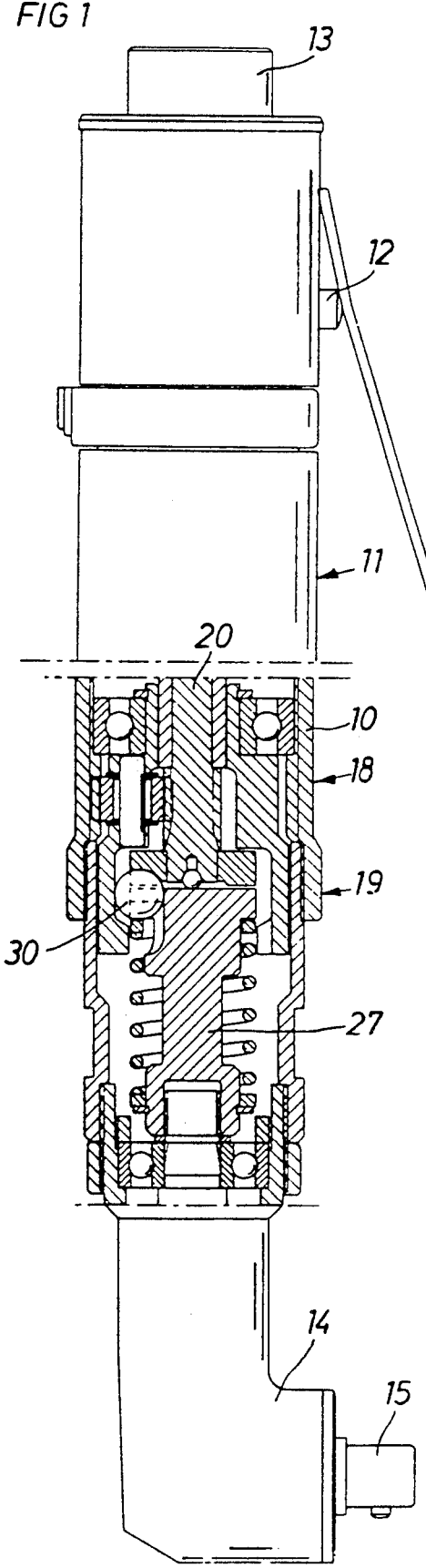
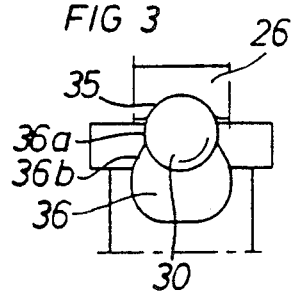
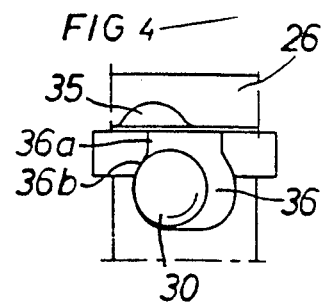
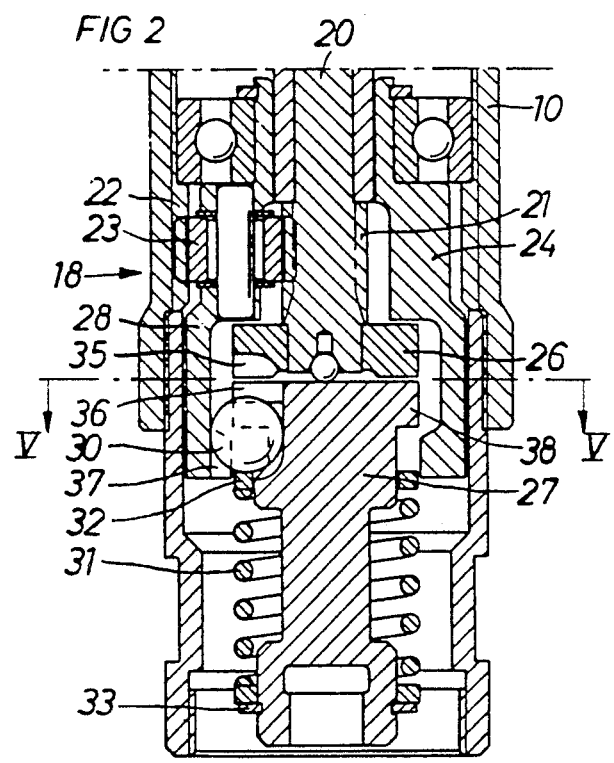
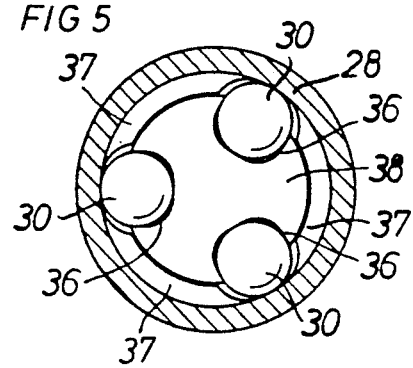

5,083,990

TWO-SPEED POWER TRANSMISSION FOR A POWER TOOL

BACKGROUND OF THE INVENTION

This invention relates to a two-speed power transmission for a power tool, like for instance a screw joint tightening tool.

In particular, the invention concerns a power transmission which comprises an input shaft, an output shaft, a planetary gear, and a torque responsive gear shift mechanism for directing torque through the planetary gear in a high torque/low speed drive mode or past the planetary gear in a low torque/high speed drive mode. The planetary gear includes a sun wheel connected to the input shaft, a ring gear and a planet wheel carrier, and the gear shift mechanism comprises a driving member connected to the sun wheel of the planetary gear, a driven member connected to the output shaft, and a number of coupling elements arranged to intercouple in a first position the driving member, and the driven member and to intercouple in a second position the planet wheel carrier and the driven member.

A two-speed power transmission of the above type is previously known through EP-B1-0136991. A drawback inherent in the device described in this publication concerns the gear shift mechanism which comprises radially acting coupling elements. This feature is disadvantageous in two different aspects, namely its tendency to cause an undesirable enlarged outer diameter of the power tool, and its dependency of rotational speed since the centrifugal action influences upon the radial shifting movements of the coupling elements and, accordingly, upon the drive mode shifting point of the transmission.

SUMMARY OF THE INVENTION

The main object of the invention is to accomplish an improved two-speed power transmission by which the above drawbacks are avoided. This is achieved by the subject matter of the claims.

BRIEF DESCRIPTION OF THE DRAWINGS

A preferred embodiment of the invention is hereinbelow described in detail with reference to the accompanying drawings.

FIG. 1 illustrates, partly in section, an angle nut runner provided with a power transmission according to the invention occupying its high speed/low torque drive mode.

FIG. 2 shows, on a larger scale, the power transmission of the tool in FIG. 2 occupying its low speed/high torque drive mode.

FIG. 3 shows a fragmentary view of the power transmission in FIGS. 1 and 2, and illustrating the high speed/low torque drive position of a coupling element.

FIG. 4 is similar to FIG. 3 but illustrates the low speed/high torque drive position of a coupling element.

FIG. 5 shows a cross-section along line V—V in FIG. 2.

DETAILED DESCRIPTION OF THE PREFERRED EMBODIMENT

The power tool shown in FIG. 1 is a pneumatic angle nut runner comprising a housing 10, a drive motor section 11, a throttle valve 12, a pressure air line connection 13, an angle head 14 with a square ended output shaft 15 and a power transmission 16.

The power transmission of the tool comprises one or more planetary reduction gears, one 18 of which forms part of an automatic gear shifting two-speed power transmission unit. The latter forms a part of the entire power transmission 16 of the tool.

The two-speed transmission comprises an input shaft 20 which also forms the sun wheel 21 of the planetary gear 18. The latter also comprises a ring gear 22 rigidly mounted in the housing 10, and three planet wheels 23 (just one visible) supported on a planet wheel carrier 24.

On the forward end of the input shaft 20, there is rigidly mounted a ring element 26 which forms the driving member of a gear shift mechanism 19. The latter also comprises a driven member 27 connected to the output shaft 15, a coupling sleeve 28 which is formed in one piece with the planet wheel carrier 24, three coupling elements in the shape of balls 30, and a coil type compression spring 31 which via a flat ring 32 (see FIG. 2) acts on the balls 30. The spring 31 takes support on a lock ring 33 mounted on the driven member 27 of the gear shift mechanism.

The driving member 26 is formed with three equally spaced indentations 35 for seating the balls 30 in a first position of the balls 30. The driven member 27 is formed with three equally spaced and axially extending grooves or channels 36. Each of these grooves 36 has a first portion 36a with parallel sides and a width slightly exceeding the diameter of the balls 30 to form a guide for the balls 30. Each of the grooves 36 also has a diverging second portion 36b. See FIGS. 3 and 4. In order to obtain deep enough grooves 35, i.e. having a depth exceeding half the diameter of the balls 30, the driven member 27 is provided with a radial flange 38. This flange 38 has an axial extent which is smaller than the diameter of the balls 30 such that portions of the balls 30 are always exposed to engagement with the spring biassed ring 32, even when the balls 30 are received in the indentations 35 at rest or during low torque/high speed operation.

The gear shift mechanism 19 further comprises a number of teeth 37 formed on the inner periphery of the coupling sleeve 28. These teeth 37 are arranged to be engaged by the balls 30 in a second position of the balls 30. For that reason, the number of teeth 37 has to be equal to or a multiple of the ball number. In the shown example, the teeth 37 are three in number. See FIG. 5.

In operation, the tool is connected to a pressure air source via connection 13, and the output shaft 15 is coupled to a screw joint to be tightened via a nut socket.

The tightening operation starts as the throttle valve 12 is activated and the drive motor section 11 starts delivering a torque through the power transmission. In a first stage, the gear shift mechanism occupies a high speed/low torque drive mode, which means that the balls 30 are seated in the indentations 35 of the driving member 26. In this drive mode, the torque delivered to the driving member 26 via input shaft 20 is transferred via the indentation 35, the balls 30 and the grooves 36 to the driven member 27. Accordingly, the torque is transferred directly from the driving member 26 to the driven member 27 without any influence by the planetary reduction gear 18. The planet wheel carrier 24 rotates freely in the housing 10.

As the torque resistance in the screw joint increases, the sloping side portions of the indentations 35, act as cam means, and apply increasing axial forces upon the balls 30, and when a predetermined torque level is reached the camming action of the indentations 35 will supercede the biassing force of spring 31. Then the balls 30 start moving axially through the grooves 36, and when the transverse diameter plane of each ball 30 leaves the straight portion 36a of the respective groove for the diverging portion 36b, the sloping side wall of the latter applies an auxiliary axial force on the balls 30. This auxiliary force supersedes the force of spring 31 and makes the balls 30 complete their axial movement to thereby discontinue their cooperation with the indentations 35 of the driving member 26. Instead, the balls 30 are brought into engagement with the teeth 37 of the coupling sleeve 28. The balls 30 have occupied their second positions.

Now, the gear shift mechanism 19 has brought the transmission into its high torque/low speed drive mode in which the torque transmission takes place via the sun wheel 21, the planet wheels 23, the planet wheel carrier 24, the coupling sleeve 28, the teeth 37, the balls 30 and the grooves 36 on the driven member 27.

This drive mode is maintained as long as the transferred torque is high enough to make the camming action of the diverging groove portions 36b dominate over the biassing force of spring 31. When the torque has decreased to that level, i.e. when the predetermined drive mode shifting point is reached, the camming action of groove portions 36b will no longer dominate over the spring force, and the balls 30 are shifted back to their first position in which they engage the indentations 35. Before starting transfer torque directly from the driving member 26 to the driven member 27, the balls 30 have discontinued their engagement with the teeth 37, thereby leaving the coupling sleeve 28 and the planet wheel carrier 24 to rotate freely.

It is to be noted that the coupling sleeve 28 provides a continuous radial support for the balls 30. Thereby, the centrifugal forces acting on the balls 30, particularly under the low torque/high speed drive mode operating conditions, have no influence upon the gear shifting movement of the balls 30.

Although not incorporated in the shown and described example, it is to be understood that in power transmissions according to the invention there may be provided means for varying the setting of the bias force exerted by the spring 31 That would make it possible to adapt the gear shift point torque level to the actual type and size of the screw joint being tightened.

It is also to be understood that the number of balls 30 is not limited to three but can be freely chosen from one, which however is not to be preferred, to four, five or six or even more where geometrically possible at bigger tool models.

I claim:

1. A two-speed power transmission for a power tool, comprising:
   a housing (10);
   an input shaft (20);
   an output shaft (15);
   a planetary gear (18); and
   a torque responsive gear shift mechanism (19) for directing toque through said planetary gear (18) in a high torque/low speed drive mode or past said planetary gear (18) in a low torque/high speed drive mode;
   said planetary gear (18) including a sun wheel (21) connected to said input shaft (20), a ring gear (22) secured in the housing (10), and a planet wheel carrier (24);
   said gear shift mechanism (19) comprising a driving member (26) connected to the sun wheel (21) of said planetary gear (18), a driven member (27) connected to said output shaft (15), and a number of coupling elements (30) arranged to intercouple in a first position said driving member (26) and said driven member (27) and to intercouple in a second position said planet wheel carrier (24) and said driven member (27);
   said driven member (27) comprising a number of axially extending grooves (36) each of which supports one of said coupling elements (30) for axial displacement of said coupling elements (30) between said first and second positions;
   said driving member (26) comprising axially acting first cam means (35) for cooperation with said coupling elements (30) in said first position of said coupling elements (30);
   said planet wheel carrier (24) comprising a coupling sleeve (28) which forms a radial support for said coupling elements (30) in both of said first and second positions of said coupling elements (30) and which is provided with a number of teeth (37) for cooperation with said coupling elements (30) in said second position of said coupling elements (30), an axially acting spring means (31) for biasing said coupling elements (30) toward said first position of said coupling elements (30), whereby the action of said spring means (31) counteracts the axial force developed by said first cam means (35) upon said coupling elements (30), such that said coupling elements (30) are maintained in said first position at torque values below a predetermined level but forced out of said first position by said first cam means (35) at torque values above said predetermined level; and
   said driven member (27) further comprising second, axially acting cam means (36b) arranged to exert an axial shifting force upon said coupling elements (30) toward said second position of said coupling elements (30) against the biasing action of said spring means (31) as said coupling elements (30) have left said first position at torque values above said predetermined level.

2. The power transmission of claim 1, wherein:
   said coupling elements (30) comprise equally sized balls (30); and
   the radial depth of said grooves (36) exceeds half the diameter of said balls (30).

3. The power transmission of claim 2, wherein said driven member (27) comprises a radial flange (38) through which said grooves (36) extend axially, said radial flange (38) having an axial extent which is smaller than the diameter of said balls (30).

4. The power transmission of claim 3, wherein said spring means (31) comprises a coil spring which is arranged in a coaxial relationship with said driven member (27) and which exerts a biasing force upon said balls (30) via a flat ring element (32) which is in continuous contact with said balls (30).

5. The power transmission of claim 2, wherein said spring means (31) comprises a coil spring which is arranged in a coaxial relationship with said driven member (27) and which exerts a biasing force upon said balls (30) via a flat ring element (32) which is in continuous contact with said balls (30).

* * * * *